G. BAUSCH.

EYEGLASS GUARD.

No. 11,389. Reissued Nov. 14, 1893.

WITNESSES:

J M Franck

Alex Imay

INVENTOR

George Bausch

BY H. A. West

ATTORNEY

UNITED STATES PATENT OFFICE.

GEORGE BAUSCH, OF SYRACUSE, NEW YORK.

EYEGLASS-GUARD.

SPECIFICATION forming part of Reissued Letters Patent No. 11,389, dated November 14, 1893.

Original No. 478,836, dated July 12, 1892. Application for reissue filed May 25, 1893. Serial No. 475,522.

*To all whom it may concern:*

Be it known that I, GEORGE BAUSCH, of Syracuse, in the county of Onondaga, in the State of New York, have invented new and useful Improvements in Eyeglass-Guards, of which the following, taken in connection with the accompanying drawings, is a full, clear, and exact description.

My invention relates, to the construction of eye-glasses, and particularly to the guards or anchors which secure the frame about the nose.

My object is to provide an attachment adapted to be readily secured to the nose guards of eye-glasses, which may be bent so as to adapt themselves to fit closely about a nose of any shape, and particularly to small noses, where the common eye glasses do not form a sufficient bite or grip for the purpose of holding the same on.

My invention consists in the several novel features of construction and operation hereinafter described and which are specifically set forth in the claims hereto annexed. It is constructed as follows, reference being had to the accompanying drawings, in which—

Figure 2:
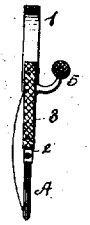
Figure 1:
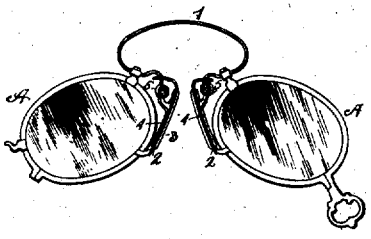
Figure 3:
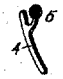

Figure 1 is a front view of eye-glasses provided with my invention. Fig. 2 is a sectional edge view thereof, and Fig. 3 is a perspective view of one of the auxiliary guards and plates.

A A are the lens frames connected by the spring 1, all of an ordinary construction, and 2 is an ordinary nose-guard secured to each lens frame and provided with a pad 3 of cork or other material. To each nose guard I connect an auxiliary guard or anchor 5 adapted to grip the nose between the eyes and adjacent to their corners. The auxiliary guards are adapted to be connected to the nose guard of any style of eye glasses by plates 4 and are provided with pads at their free ends and are auxiliary to the guard in that they anchor the guards upon the nose, and hold the glasses firmly upon the nose, and prevent their slipping off therefrom, and holding the glasses steady and firm and preventing their shaking and vibration from any cause. In this latter respect they are a valuable aid to vision and to weak eyes. It will also be seen that these auxiliary guards can be readily bent with pliers, so as not only to fit them to the nose but to vary their tension thereon.

What I claim as my invention, and desire to secure by Letters Patent, is—

1. The combination with the lens holders and nose guards secured thereto, of auxiliary guards connected to the main nose guards between their points of attachment to the frame and their free ends, and adapted to grip the nose, substantially as described.

2. The combination with the lens holders and the nose guards secured thereto of auxiliary guards connected to the main nose guards by plates 4 and provided with pads and adapted to grasp the nose, substantially as described.

3. The combination, with the lens holders and the nose guards secured thereto of auxiliary guards connected to the main nose guards between their points of attachment with the frame and their free ends and consisting of arms provided with pads at their free ends and adapted to grip the nose between the eyes, substantially as described.

GEO. BAUSCH.

Witnesses:
C. M. WARNER,
J. C. CHASE.